United States Patent [19]

Petrozello

[11] 4,441,785
[45] Apr. 10, 1984

[54] ROTARY FIBER OPTIC SWITCH

[75] Inventor: James R. Petrozello, Endicott, N.Y.

[73] Assignee: International Business Machines Corporation, Armonk, N.Y.

[21] Appl. No.: 316,185

[22] Filed: Oct. 29, 1981

[51] Int. Cl.³ ............................................... G02B 7/26
[52] U.S. Cl. .................................................. 350/96.20
[58] Field of Search ................ 350/96.15, 96.20, 96.24

[56] References Cited

U.S. PATENT DOCUMENTS

| 3,883,222 | 5/1975 | Gunderson | 350/96 |
| 4,088,387 | 5/1978 | Lewis | 350/96.15 |
| 4,245,886 | 1/1981 | Kolodzey et al. | 350/96.20 |
| 4,277,134 | 7/1981 | Upton, Jr. | 350/96.15 |

FOREIGN PATENT DOCUMENTS 2651776  5/1977  Fed. Rep. of Germany ... 350/96.20

Primary Examiner—John D. Lee
Assistant Examiner—Frank González
Attorney, Agent, or Firm—Gerald R. Gugger

[57] ABSTRACT

Electronic signals which are converted to light signals by means of a light emitting diode or laser diode are channeled through a fiber optic group and enter a rotary fiber optic switch. A rotatable drum channels and distributes the light signals to intended output locations by means of light conductive elements in the drum. Selecting the desired position of the drum by means of a detent switch or by mechanically rotating the drum by a light actuated mechanism determines the channel orientation of the device. The output signals emerge from the light conductive elements in the drum and are transmitted through output fiber optic groups to a photo diode or photo transistor where they are converted into electronic signals for normal electronic I/O processing.

3 Claims, 6 Drawing Figures

ROTARY FIBER OPTIC SWITCH

BACKGROUND OF THE INVENTION

It has become increasingly desirable to use optical systems for the transmission of signal information and data. This is particularly true in large data processing systems where large amounts of signal information must be transmitted between the several operating units which make up the total system. Advantages of using an optical system over the conventional use of copper circuit lines is that more signals can be transmitted along a single fiber optical cable and "cross-talk" or interference between signal lines is eliminated. As in the case of electrical and electronic signal transmission systems, the functionally comparable optical signal information transmission systems must provide the capability of selectively switching optical signals from one transmission path to another.

Prior art techniques for carrying out the switching of light energy from one path to another has been achieved in a number of different ways. For example, one technique provides a fiber optic switch which comprises two independent manually rotatable subassemblies for switching light energy from one of a plurality of optical paths to a selected one of another plurality of optical paths. Another technique makes use of a beam splitter or the mechanical motion of a deflecting mirror positioned to interrupt light energy signals and redirect the light energy of a beam to another optical light path. These prior art techniques, as well as others, have the disadvantage that they are limited in flexibility for use in computer applications. Additionally, many of the prior art techniques and practices require either manual or electrical servomechanism actuation and are not readily adaptable to both manual and electrical servomechanism actuation.

It became evident that an optical switch was required which possessed a greater degree of flexibility and which could be readily operated either manually or by electrical servomechanism means.

SUMMARY OF THE INVENTION

The present invention comprises a rotary fiber optic switch as a means of controlling distribution of light signals. This device channels signals to the desired location and also provides a means for rapidly switching on or off plus changing the output locations. The incoming light signals may also be selectively distributed to either one or more than one of the output locations.

The rotary fiber optic switch comprises a rotary drum having specifically positioned light conductive elements. The drum is fastened on a shaft which is rotatably mounted in a housing. Fiber optic cable sockets are positioned in specific locations around the periphery of the housing. These socket positions correspond to the light conductive elements in the rotary drum which is positioned inside the housing. The number of housing sockets depends on the desired use of the device.

An input cable consisting of fiber optic strands situated in a shroud is plugged into one of the switch housing sockets and held in place by suitable detent means. In similar fashion, output cables consisting of fiber optic strands are plugged into the remaining switch housing sockets. Electronic signals are converted to light signals by means of a light emitting diode or laser diode and are channeled through the input cable and into the rotary drum. Selecting a desired position of the drum determines the channel orientation of the device, i.e., certain light conductive elements in the drum are positioned to transmit the light signals from the input cable to the desired one or more of the output cables. Split light conductive elements are used to distribute the incoming light signals to more than one output fiber optic strand.

Positioning of the drum may be done manually by rotating a switch control knob fastened on the end of the rotatable drum shaft. The control knob is held in an exact alignment by means of a control knob detent which locks the control knob in the proper position. Doing so positions the rotary drum containing the light conductive elements and directs the incoming light signals to the desired fiber optic output cables. Aligning the control knob to a specific neutral position will stop all light signal transmittance.

In addition to being manually actuated, the present switch is readily adaptable for actuation by electrical servomechanism means. This is accomplished by providing a drum rotating gear which is loosely mounted on the drum shaft and which is connected by spring ball detent means to the switch control knob fastened to the drum shaft. The drum rotation gear is connected to the drive gear of a servomotor. Input signals to the servomotor will drive the drum rotation gear, detent means, the control knob, and the drum shaft to selectively position the drum. The switch is readily adaptable to be constructed for manual actuation only, for servomechanism actuation only, or for both manual and servomechanism actuation.

In addition to being operable either manually or by electromechanical means, the present switch is substantially free of contact wear and increased distribution capability may be obtained by using an optical grade polycarbonate resin to pre-form the light conductive elements prior to molding in the drum.

Accordingly, it is a primary object of the present invention to provide a novel and improved rotary fiber optic switch for selectively coupling input optical signals to one or more of a plurality of optical output paths.

A further object of the present invention is to provide a rotaryf fiber optic switch which is readily adapatable for either manual or electromechanical actuation for selectively coupling input optical signals to one or more of a plurality of optical output paths.

A still further object of the present invention is to provide a rotary fiber optic switch for selectively coupling input optical signals to one or more of a plurality of optical output paths wherein pre-formed light conductive elements increase the distribution capability.

The foregoing and other objects, features and advantages of the invention will be apparent from the following more particular description of preferred embodiments of the invention, as illustrated in the accompanying drawings.

DESCRIPTION OF PREFERRED EMBODIMENTS

Figure 1:
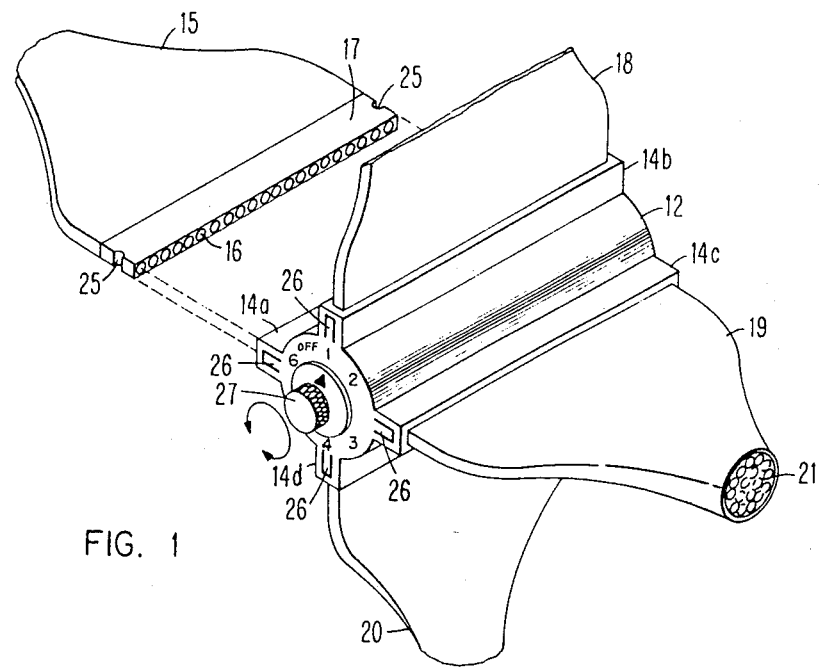
FIG. 1 is a partial exploded isometric view showing the rotary fiber optic switch of the present invention with manual actuation means.
Figure 2:
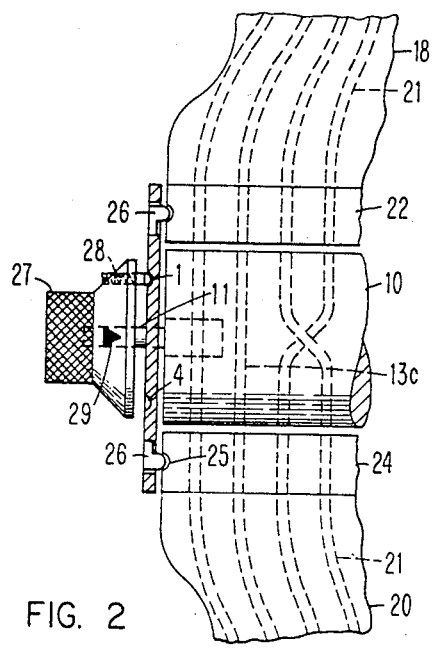
FIG. 2 is a partial sectional view showing the detenting arrangement for the control knob and cable shrouds of the switch in FIG. 1.
Figure 3:
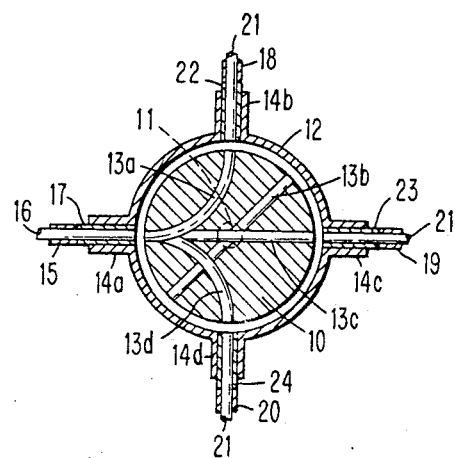
FIG. 3 is a sectional view showing an arrangement of some of the light conductive elements in the drum of the switch.

Referring to FIGS. 1, 2 and 3, in one embodiment, the rotary fiber optic switch of the present invention is shown having manual actuation means. The switch comprises a molded solid plastic rotary drum 10 fastened on a shaft 11 which is journaled for rotation in suitable guide holes in the ends of a molded housing 12 which encloses the drum. A plurality of pre-formed light conductive elements 13a, 13b, 13c and 13d are specifically positioned in the drum. Fiber optic cable sockets 14a, 14b, 14c and 14d are formed in specific locations around the periphery of the housing and these socket positioned communicate with the periphery of the drum and correspond to the light conductive elements in the rotatable drum 10.

Drum 10 is molded of a suitable glass-filled phenolic to give excellent stability and accuracy during and after molding. It is inert and not affected by moisture or chemicals. The light conductive elements 13 may be made of glass fibers or more preferrably of an optical grade "Lexan" which is a trademark of the General Electric Company for thermoplastic polycarbonate resins which may be used as molding or extrusion compounds or in films, varnishes or coactings. The resins possess an unusual combination of toughness, impact strength, heat resistance, dimensional stability, and good electrical properties. In addition, it may be pre-formed to give the light conductive elements the desired configurations prior to molding in the drum. This results in more distribution capability. If glass fibers are used for the light conductive elements, they can be positioned when molding the drum. Both are excellent light transmitting material. Conventional molding practice is used and cylindrical grinding and polishing of the drum is carried out for tolerance accuracy. The housing 12 and housing cable sockets 14a-14d are also molded of "Lexan" for regidity and accuracy. The number of housing cable sockets depends on the desired use of the device. For purposes of illustration, four sockets are shown.

An input signal cable 15 consists of a group of fiber optic or glass strands 16 which terminate in a row in a plastic shroud 17 which is plugged into the housing cable socket 14a and which communicates with the periphery of the drum. Each glass strand 16 communicates with the periphery of the drum and may carry one input signal or a series of input signals and the number of glass strands used will depend upon the number of input signals desired. The input signals may originate, for example, from a CPU or central processing unit of a data processing system. These electronic signals are converted to light signals in the well-known manner by means of light emitting diodes or laser diodes and are channeled through the fiber optic input group of strands 16 to enter the switch. If desired, each strand 16 could comprise a plurality of hair-like strands to give physical flexibility.

The pre-formed light conductive elements, such as, 13a-13d, are disposed along the axis of the drum, there being one element associated with each input strand 16. As will be later described, all, some, or none of the ends of the light conductive elements may be put in alignment with the input strands in shroud 17 depending upon the position of the drum and the pre-formed configuration of the conductive elements.

In similar fashion, output signal cables 18, 19 and 20 consist of a group of fiber optic or glass strands 21 which terminate in a row in their respective plastic shrouds 22, 23 and 24 which are plugged into the housing cable sockets 14b, 14c and 14d so that strands 21 communicate with the periphery of the drum. As in the case of the input to the switch, all, some, or none of the ends of the conductive elements may be put in alignment with their associated output strands 21 in one or more of the shrouds 22, 23 and 24, depending upon the position of the drum and the pre-formed configuration of the conductive elements. The input light signals are channeled through the selected conductive elements and their associated output strands in the selected one or more of the output fiber optic groups and are transmitted to peripheral equipment, for example, of the data processing system where there are converted to electronic signals in the well-known manner by the use of photo diodes or photo transistors for normal I/O or data processing.

Detent means are provided to hold the cable shrouds in place when they are plugged into the housing cable sockets. Referring to FIG. 2, each end of each of the cable shrouds is provided with an indentation 25. The end walls of the housing 12 are provided with spring finger latches 26 positioned to engage in the indentations 25 of the cable shrouds when they are plugged in to hold them in place.

To manually select the desired light transmission paths through the switch, a control knob 27 is provided which is fastened on the end of the drum shaft 11. As shown in FIG. 2, the control knob is provided with a spring actuated ball detent 28 which will seat in six programmable positions plus an "off" position identified by the indentations 1–6 and "off" arranged around the end of the housing 12, as more clearly shown in FIG. 6. An indicator pointer 29 is provided on the knob and manual rotation of the knob in either direction to detent into a selected one of the six programmable positions will rotate the drum and put selected ones of the light conductive element in alignment with the input strands 16 and the output strands 21 of the selected one or more of the output fiber optic groups to complete light transmission paths therebetween. Rotation of the knob and drum to the "off" position will block the transmission of any light through the switch.

Referring to FIG. 3, only the four light conductive elements 13a-13d are shown for purposes of illustration. It will be understood that any number of these elements may be disposed along the drum depending upon the desired capacity of the drum and they may have different pre-formed configurations. With the control knob set to position 1, the drum is in the position shown in FIG. 3 and it can be seen that in this position input light signals from input cable 15 are channeled through element 13a to output cable 18, through element 13c to output cable 19, and through element 13d to output cable 20. Element 13b is not in a position to transmit any light signals. If the switch is set to position 2, input light signals will be transmitted only through element 13b to the output cable 19. In position 3, no input light signals are transmitted. In positions 4 and 5, input light signals are transmitted only through element 13c to output cable 19. In position 6, input light signals are transmitted through element 13a to output cable 20, and in the "off" position, none of the elements are in position to transmit any light signals through the switch.

Figure 4:
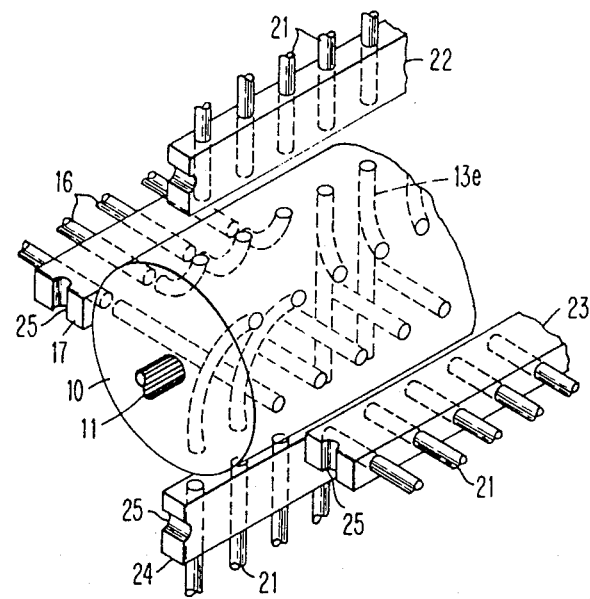
FIG. 4 is a partial isometric view showing some of the split light conductive elements in the drum of the switch.

If increased flexibility of distribution is desired, the light conductive elements may be preformed to have a split configuration, as shown by the element 13e in FIG. 4, in which case signals from one input strand are channeled to more than one output strand or output cable. Also, use of only four of the six programmable positions has been shown. Use of all six positions would further increase the flexibility of distribution. And the drum could be made smaller or larger to accommodate any number of programmable positions.

Figure 5:
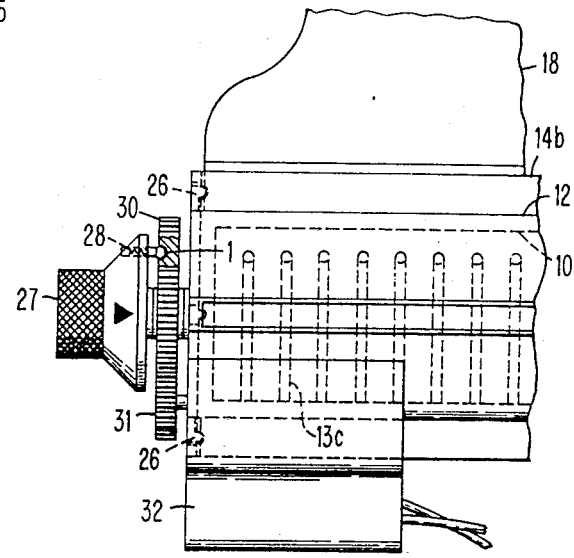
FIG. 5 is a side elevation view of the rotary fiber optic switch of the present invention with both manual actuating means and electromechanical actuating means.
Figure 6:
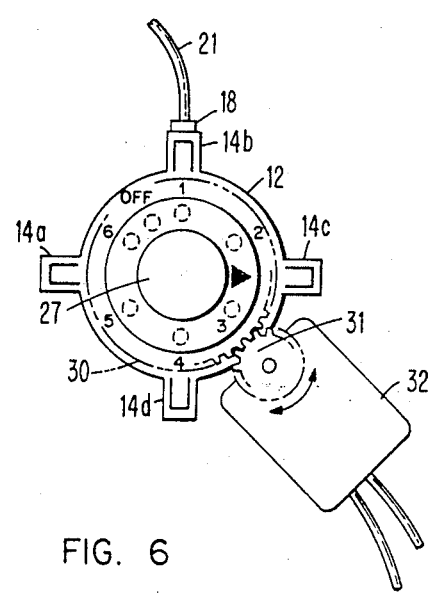
FIG. 6 is an end view of the switch shown in FIG. 5.

Referring now to FIGS. 5 and 6, a second embodiment of the switch is shown wherein the switch may be actuated manually and also by electromechanical means. As previously described, the control knob 27 is fastened on the end of the drum shaft 11 and includes the spring actuated ball detent 28. However, the programmable positions identified by the 1-6 and "off" indentations, which coact with the ball detent, are now arranged around the periphery of a drum gear 30 which is loosely mounted for rotation on drum shaft 11. The drum gear meshes with a driving gear 31 which is driven by a servomotor 32.

If the servomotor is not being used, the driving gear 31 will prevent the drum gear 30 from rotating and the switch can be manually operated by rotating the control knob to rotate the drum to the desired positions, as indicated by the programmable position indentations on the locked drum gear 30.

If electromechanical actuation of the switch is desired, the switch may be manually set to the 1 position and the servomotor provided with suitable input pulses. The motor through driving gear 31 will drive the drum gear 30 which by means of the spring actuated ball detent 28 will rotate the control knob, drum shaft, and drum to the desired position. If desired, the control knob may be provided with a second spring actuated ball detent for increased stability.

The switch may also be constructed for electromechanical actuation only. In this case, the control knob and detent arrangement are eliminated and the drum gear 30 is fastened to the drum shaft. The drum is manually set to the start position during assembly.

The adaptability of the present switch for manual and/or automatic operation is advantageous from the user standpoint. Small or low end data processing systems where switching requirements are low would probably need only a manually operative switch whereas large data processing systems having high switching requirements would likely need the automatic operating version of the switch. Also, some data processing systems may have switching requirements which vary for different parts of the system in which case use of both operative features of the switch would be desirable.

Additionally, it can be seen that the use of a material that can be pre-formed to construct light conductive elements having different configurations which elements can be precisely molded in predetermined positions in the drum to facilitate programming results in a highly sophisticated switch having a great degree of flexibility.

While the switch has been described for use in data processing systems, some other applications would be:
1. Local computer data networks (example) switching peripheral computer devices in and out of local networks.
2. Optical by-pass device (example) fail safe mechanism.
3. Tele-communications (example) cross point switch
4. Computer access security (example) optical switch prevents problems caused to peripheral equipment as a result of electrical interference typical to electronic switches.
5. Cable TV (example) distribution of cable TV signals to individual sites.

While there have been shown and described and pointed out the fundamental features of the invention as applied to preferred embodiments, it will be understood that various omissions and substitutions and changes may be made in the form and details of the embodiments by those skilled in the art without departing from the spirit of the invention. It is the intention, therefore, to be limited only as indicated by the scope of the following claims.

What is claimed is:

1. A rotary fiber optic switch for controlling and distributing light signal impulses comprising;
   a cylindrical housing;
   a drum rotatably mounted within said housing;
   a plurality of cable sockets positioned at specific locations around the periphery of said housing and communicating with the periphery of said drum;
   an input fiber optic cable connected to one of said cable sockets and having a plurality of fiber optic strands communicating with the periphery of said drum and each of which may transmit a series of input light signal impulses;
   a plurality of output fiber optic cables, there being one connected to each of the remaining cable sockets and communicating with the periphery of said drum;
   a plurality of output fiber optic strands in each one of said output cables and communicating with the periphery of said drum for transmitting a plurality of output light signal impulses;
   a plurality of light conductive elements arranged within said drum, there being one conductive element associated with each one of said input fiber optic strands for transmitting the input light signal impulses from said input cable to the output fiber optic strands in one or more of said output cables; and
   means for selectively positioning said drum and light conductive elements to complete one or more light paths between said input fiber optic cable and simultaneously more than one of said output fiber optic cables.

2. A rotary fiber optic switch for controlling and distributing light signal impulses comprising;
   a cylindrical housing;
   a drum rotatably mounted within said housing;
   a plurality of cable sockets positioned at specific locations around the periphery of said housing and communicating with the periphery of said drum;
   an input fiber optic cable connected to one of said cable sockets and having a plurality of fiber optical strands communicating with the periphery of said drum and each of which may transmit a series of input light signal impulses;

a plurality of output fiber optic cables, there being one connected to each of the remaining cable sockets and communicating with the periphery of said drum;

a plurality of output fiber optic strands in each one of said output cables and communicating with the periphery of said drum for transmitting a plurality of output light signal impulses;

a plurality of programmable pre-formed light conductive elements having different configurations arranged within said drum, there being one conductive element associated with each one of said input fiber optic strands for transmitting the input light signal impulses from said input cable to the output fiber optic strands in one or more of said output cables; and means for selectively positioning said drum and light conductive elements to complete one or more light paths between said input fiber optic strands in said input cable and the output fiber optic strands in simultaneously more than one of said output cables.

3. A rotary fiber optic switch as defined in claim 2 and having pre-formed light conductive elements which have a split configuration for transmitting a single input light signal impulse from an input fiber optic strand to output fiber optic strands in more than one of said output cables.

* * * * *